United States Patent [19]

Juhasz

[11] 4,067,061

[45] Jan. 3, 1978

[54] MONITORING AND RECORDING SYSTEM FOR VEHICLES

[75] Inventor: John Emil Juhasz, Lake Orion, Mich.

[73] Assignee: Rockwell International Corporation, Pittsburgh, Pa.

[21] Appl. No.: 559,509

[22] Filed: Mar. 18, 1975

[51] Int. Cl.[2] .......................... G06F 3/05; G06F 3/02; G06F 13/00

[52] U.S. Cl. .................................. 364/900; 340/52 F; 364/424

[58] Field of Search .................... 340/172.5, 24, 52 R, 340/52 A, 52 B, 52 C, 52 F, 52 H, 309.1; 346/33 D, 33 M, 60, 61, 74 M; 235/30 R, 45, 150.2

[56] References Cited

U.S. PATENT DOCUMENTS

| | | | |
|---|---|---|---|
| 2,392,467 | 1/1946 | Engel et al. | 346/60 X |
| 3,099,817 | 7/1963 | Kendall | 346/33 D |
| 3,154,770 | 10/1964 | Schwab et al. | 364/900 |
| 3,188,647 | 6/1965 | Davis | 346/60 |
| 3,461,429 | 8/1969 | Gray | 340/172.5 |
| 3,512,706 | 5/1970 | Bruce-Sanders | 235/30 R |
| 3,568,161 | 3/1971 | Knickel | 340/24 X |
| 3,581,289 | 5/1971 | Wilhelm | 340/172.5 |
| 3,582,901 | 6/1971 | Cochrane et al. | 364/200 |
| 3,588,837 | 6/1971 | Rash et al. | 364/200 |
| 3,623,021 | 11/1971 | Haskin et al. | 364/900 |
| 3,665,417 | 5/1972 | Low et al. | 364/200 |
| 3,678,468 | 7/1972 | Jefferson et al. | 364/900 |
| 3,702,989 | 10/1972 | Provenzano et al. | 340/172.5 |
| 3,703,985 | 11/1972 | Berg | 235/30 R |
| 3,716,679 | 2/1973 | Graesslin et al. | 346/74 M X |
| 3,720,911 | 3/1973 | Bomar | 340/52 F |
| 3,721,813 | 3/1973 | Condon et al. | 364/200 |
| 3,753,243 | 8/1973 | Ricketts et al. | 340/172.5 |
| 3,764,989 | 10/1973 | McClellan | 364/900 |
| 3,771,144 | 11/1973 | Belady | 340/172.5 |
| 3,780,272 | 12/1973 | Rohner | 235/150.2 |
| 3,792,445 | 2/1974 | Bucks et al. | 340/172.5 |
| 3,824,559 | 7/1974 | Grundy et al. | 364/900 |
| 3,829,841 | 8/1974 | Steinberg | 364/200 |
| 3,843,874 | 10/1974 | Kelch | 235/150.2 |
| 3,860,807 | 1/1975 | Fichter et al. | 235/30 R |
| 3,866,166 | 2/1975 | Kerscher et al. | 340/52 F |
| 3,866,185 | 2/1975 | Etra et al. | 364/900 |
| 3,870,818 | 5/1975 | Barton et al. | 340/52 F |
| 3,889,104 | 6/1975 | Smith | 235/150.2 |
| 3,903,513 | 9/1975 | Haydon et al. | 340/309.1 X |
| 3,925,641 | 12/1975 | Kashio | 235/150.2 |
| 3,928,756 | 12/1975 | Auray | 235/150.2 X |
| 3,936,071 | 3/1976 | Ricketts et al. | 340/52 R |
| 3,937,933 | 2/1976 | Warkentin | 235/30 R X |
| 3,938,075 | 3/1976 | Reddy | 340/52 R |
| 3,947,811 | 3/1976 | Hodgson | 340/52 F |
| 3,953,720 | 4/1976 | Kelsch | 235/30 R |
| 3,964,302 | 6/1976 | Gordon et al. | 340/52 F X |
| 4,013,875 | 3/1977 | McGlynn | 235/150.2 |
| 4,031,363 | 6/1977 | Freeman et al. | 235/150.2 |

*Primary Examiner*—Gareth D. Shaw
*Assistant Examiner*—Jan E. Rhoads

[57] ABSTRACT

A system is disclosed adapted to be carried on board a vehicle, such as a heavy duty truck operating on an interstate basis, wherein various operational and reference parameters of the vehicle, such as, the State of operation, mileage, fuel consumed, fuel purchased and time periods, are monitored and are recorded onto a recording medium, such as a tape cassette, which is removable from the system at the end of a trip, with the data recorded thereon being usable to produce a print-out of the monitored parameters.

8 Claims, 1 Drawing Figure

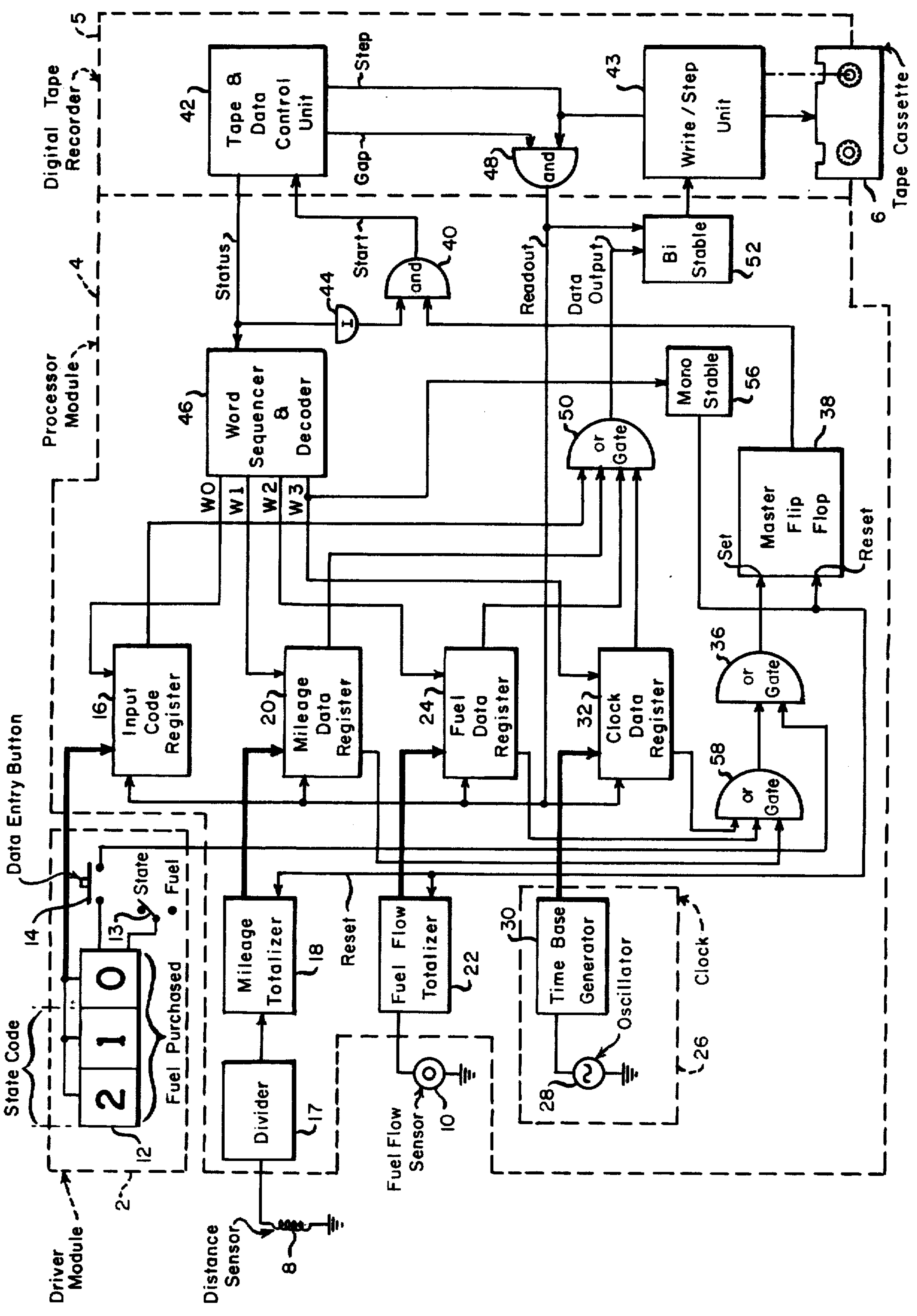

Digital Tape Recorder
5
Processor Module
4
Driver Module
2
Tape & Data Control Unit
42
Step
Gap
Status
Start
and
40
I
44
48
and
Write / Step Unit
43
Tape Cassette
6
Readout
Data Output
Bi Stable
52
Word Sequencer & Decoder
46
W0
W1
W2
W3
Mono Stable
56
or Gate
50
Master Flip Flop
38
Set
Reset
Input Code Register
16
Mileage Data Register
20
Fuel Data Register
24
Clock Data Register
32
or Gate
36
or Gate
58
Data Entry Button
14
State
Fuel
13
State Code
2
1
0
Fuel Purchased
12
Mileage Totalizer
18
Reset
Fuel Flow Totalizer
22
Time Base Generator
30
Oscillator
28
Clock
26
Divider
17
Fuel Flow Sensor
10
Distance Sensor
8

MONITORING AND RECORDING SYSTEM FOR VEHICLES

BACKGROUND OF THE INVENTION

The present invention relates to monitoring and recording systems and, more particularly, to such systems for monitoring and recording parameters of a vehicle.

Regulated trucks operating in interstate commerce are required by the U.S. Department of Transportation and the Interstate Commerce Commission to maintain trip records for each trip made by such a vehicle. A trip record includes such identifying information as the owner or lessee of the truck, the driver's name, truck and trailer numbers, starting date and location and the ending date and location. The driver of the truck is required to insert on the report operational data such as: the beginning odometer reading, the originating State and date, the States subsequently entered and the date of entry and the odometer reading entry into that State. Also the number of gallons of fuel purchased in each State on the trip is recorded by the driver on the trip record. The keeping of trip cards by a driver is, of course, a time-consuming and hence expensive procedure. It is often difficult for the driver to enter the odometer reading as he leaves one State and enters another, or the driver may forget to make an entry. This then necessitates that the odometer reading at the State line be estimated.

Maintaining accurate records of miles travelled in a State and fuel consumed in a State is important from another standpoint. If a State imposes a use tax on fuel consumed in that State, the truck operator may be entitled to a tax rebate if more fuel is purchased in a State than actually consumed. In order to justify such a rebate, however, accurate records will normally be required by the State taxing authority. It would thus become desirable to maintain a record of the actual fuel consumed in a given State rather than merely the amount of fuel purchased within that State.

In view of the foregoing, it would be highly desirable to provide a system on board a regulated vehicle which would permit the monitoring and recording of operation parameters, such as, States operated in, time, mileage and fuel purchased in that State, with the monitoring and recording being accomplished with minimal driver involvement. The recording could then be used for providing a printout of the information required on a trip record. For tax reasons it would also be useful to monitor and record other parameters such as the amount of fuel actually consumed in a State.

SUMMARY OF THE INVENTION

Broadly, the present invention provides a system for mounting on a vehicle wherein various parameters of the vehicle are monitored and recorded in digital form and the recording is utilizable to provide a printout of data satisfying regulatory requirements and aiding in the efficient operation of the vehicle.

DESCRIPTION OF THE DRAWINGS

The single FIGURE is a block diagram embodying the teachings of the monitoring and recording system of the present invention.

DESCRIPTION OF THE PREFERRED EMBODIMENT

Referring to the Figure, the system as shown is adapted for mounting on a vehicle, e.g., a heavy truck engaged in interstate commerce. The system includes a driver module 2, which is mounted at a location in the truck convenient to the driver while driving, such as on the dash or instrument panel of the vehicle. Also included is a processor module 4, indicated by the dotted box, which may be mounted at any convenient location in the cab. The recording apparatus employed is a digital tape recorder 5 including tape cassette 6, which is removable from the processor module 4. The parameters monitored are recorded onto the tape cassette 6 in digital form. Upon removal from processor module 4, the tape cassette 6 may be inserted into a tape reader and processed in a computer apparatus for providing a printout of the parameters recorded on the tape. Other recording or storage media may, of course, be employed for the digital storage of parameters, e.g., discs, solid state memory devices, etc.

Two of the parameters monitored in the present system are distance and fuel consumption. A distance sensor 8 associated with one of the wheels of the vehicle and which may comprise a wheel distance sensor such as employed by the assignee of the present application in its brake control system being the trademark "Skid-trol." The distance sensor 8 provides a pulse output in response to a unit of distance travelled by the wheel monitored.

In order to monitor the fuel consumed by the vehicle, a fuel flow sensor 10, which may comprise a commercially available fuel metering device which provides a pulse, for example, for each tenth of a gallon of fuel consumed in the engine of the vehicle. A metering device of this type is typically connected in series with the line from the feul tank to the engine fuel pump and thereby directly monitors the fuel demand from the engine.

The system will now be described with reference to a typical sequence of operations at the beginning, during, and end of a trip. The driver module 2 includes a manual input device 12, a State/fuel switch 13 and a data entry button 14. The device 12 includes three thumbwheels and may comprise a binary coded decimal thumbwheel input device of the type presently on the market. By setting the switch 13 to the "State" position, the left two thumbwheels are operative to input the State code number. In the "Fuel" position of switch 13, the three thumbwheels together are operative to input the fuel purchased, with the right hand thumbwheel serving to enter tenths of a gallon. The thumbwheel device 12 provided a binary coded decimal output of 12 bits — 4 bits for each digit. In the "State" mode the four bits for the right handwheel would, e.g., be O's. In the "Fuel" mode, a thirteenth bit, e.g., would be added to identify this mode.

The 12 bit digital word indicating the numbers entered on the thumbwheels of the manual input device 12 is applied to an input code register 16, which comprises a parallel to serial converter having 16 stages which may serially be read out by applying READOUT pulses thereto. The function of the register 16 is to store, in digital form, State or fuel purchased data as represented by the numbers set on the thumbwheels.

At the beginning of a trip, the driver sets the State code thumbwheels to a reference number, e.g., "OO,"

with the right thumbwheel always being maintained at zero except for fuel purchase inputs. The driver then depresses the data entry button 14 which initiates the entry of any accumulated data in the system and the recording of such data on the tape cassette 6 as will be described in detail below. Any data which might have been accumulated in the system since the end of the last trip with respect to mileage and fuel consumption would be recorded in order to prevent any gaps in the information. Additionally, the starting reference time would be recorded. The driver would manually record the beginning odometer reading and the starting date.

The driver would then enter the State code for the State in which he is starting the trip into the left two thumbwheels. As shown on the Figure, the reference number "21" is entered indicating, for example, that the originating State is the State of Michigan. The driver then begins the trip. As the vehicle moves, the distance sensor 8 supplies pulses at a rate indicative of the distance travelled. The pulse output of the sensor 8 is applied to a divider 17, which divides down the number of pulses to a useful level, e.g., one pulse for quarter mile travelled. These pulses are supplied to a mileage totalizer 18 located within the processor module 4. The mileage totalizer 18 comprises a 12 stage counter which supplies a 12 bit digital word output to a mileage data register 20, which comprises a parallel to series converter similar to register 16 and which functions as a temporary storage for mileage travelled data.

The actual fuel being consumed by the engine of the vehicle is monitored by the fuel sensor 10, with a pulse being provided to a fuel flow totalizer 22, for example, for each one tenth of a gallon of fuel consumed. The fuel flow totalizer 22 comprises a 12-stage counter which supplies a 12 bit digital word output corresponding to the fuel consumption data to a fuel data register 24. The fuel data register 24 comprises a parallel to serial converter similar to the registers 16 and 20 and operates as a temporary storage for fuel consumed data.

Time is continuously being monitored whether the vehicle is in operation or not by a 24-hour digital clock 26, which includes an oscillator 28 for supplying signals at a fixed frequency to a time base generator 30. In response to the pulse inputs thereto from oscillator 26, the generator 30 provides a 12 bit digital word output indicative of the time in hours and minutes on a 24-hour basis. At midnight 24:00, the counting operation commences again, the next digital output indicating the time 00:01, etc. A clock data register 32 receives the 12 bit digital output of the time base generator 30. The register 32 comprises a parallel to serial converter for storing and continually updating the time and is similar to registers 16, 20 and 24.

When the driver crosses a state line, for example, the Michigan/Ohio State line, he presses the data entry button 14 and then changes the State code to that for Ohio, for example, the reference number "34" in the left two thumbwheels of the device 12. The depression of the data entry button 14 instigates the recording of the data stored in the input code register, the mileage data register 20, the fuel data register 24 and the clock data register 32.

When the data entry button 14 is depressed, a binary "1" is applied to an OR gate 36 which then supplies a SET signal to a master flip flop 38. The output of the flip flop 38 is supplied to an AND gate 40. The digital tape recorder 5 includes a tape and data control unit 42 and a write/step unit 43 for controlling the tape cassette 6. A commercially available digital tape recorder including tape data control and write/step units is marketed by Datel Systems, Incorporated, Canton, Massachusetts.

The tape and data control unit 42 provides a "0" STATUS output until a "1" START pulse is inputted thereto. Thus, since the STATUS output of the unit 42 is applied via an inverter 44 as the other input to the AND 40, a "1" START pulse will be applied from the AND 40 to the unit 42, thereby causing a "1" level STATUS output to be supplied from the unit 42 to a word sequencer and decoder 46.

The STATUS output is maintained at a "1" level for an 18 bit time interval. A first output Wo of the word sequencer and decoder 46 is normally a "1" and is applied to the input code register 16. The "1" word output Wo will remain until the 18 bit long STATUS level returns to "0." The word output Wo activates the input code register 16 and the 12 bit digital word stored therein may be outputted in serial form in response to READOUT pulses supplied thereto.

READOUT pulses are supplied in the following manner. A GAP output having a "1" level for a 16 bit time duration is provided by the tape and data control unit 42. The GAP output is delayed two READOUT pulses in time from the start of the "1" level STATUS output and is applied as one input to an AND gate 48. The other input to the AND gate 48 is a STEP signal which comprises a series chain of 18 bits. Thus the output from the AND gate 48 is a series chain of 16 READOUT pulses. The 16 READOUT pulses are sequentially applied to input code register 16 and also to the registers 20, 24 and 32. In response to each of the pulses to the input code register 16, the data stored in the register 16 is outputted in serial form to an OR gate 50. As previously discussed, the data stored in each of the registers 16, 20, 24 and 22 is a 12 bit word, while each of the registers has 16 stages. Thus, the inputting of 16 READOUT pulses translates the 12 bit data from the register and clears the register. The output of the OR gate 50 is thus the data output in serial form and is applied to a bi-stable circuit 52. The bi-stable 52 is triggered to change output states in response to the transition from "1" to "0" of the READOUT pulses from the AND 48 and thus delays the data output by one-half cycle.

The output of the bi-stable 52 is provided to a write head, not shown, in the write/step unit 43 of the tape recorder 5 for recording on the tape cassette 6 under the control of the STEP output of the unit 42. The STEP output comprising a series chain of 18 pulses is supplied to a step motor, not shown, of the unit 43. In response to each pulse, the step motor causes the tape on the tape cassette 6 to be stepped by a predetermined increment, for example, 0.0015 inches per bit. The mechanical coupling between the write/step unit 43 and the tape cassette 6 is schematically shown by the dotted connection therebetween. After each pulse of the 18 bit chain, the tape will stop until the next pulse is received. It is during this stopped "write" period that the half-cycle delayed data output from the bi-stable 52 is supplied to the write head of the tape recorder 5 for recording onto the tape. Thus, the sequence of operation is: the tape is stepped in response to a STEP pulse, then stopped during a write period when one bit of data from the bi-stable 52 (corresponding to the data output of the register 16 then being read out) is recorded onto the tape.

At the end of the 18 bit time interval, the "1" level STATUS input to the word sequence and coder 46 will revert to a "0" level, the word output Wo will go to a "0" and the next output W1 of the unit 46 will be sequenced to a "1" level. Since the STEP output of the unit 4 comprises an 18 bit pulse chain, the tape will be stepped accordingly so that a gap will be provided between the 16 bit data that was outputted from the input code register 16 and the data stored in the mileage data register 20 which is next to be recorded onto the tape cassette 6.

When the STATUS output of the unit 42 goes to its "0" level, the inverter 44 provides a "1" to the AND gate 40. With the master flip flop 38 still in the SET state, a START signal is provided by the AND 40 to the tape and data control unit 42 which causes a "1" STATUS output level to be provided to the word sequencer and decoder 46. As previously discussed, a 16 bit GAP output and an 18 bit STEP output are supplied from the unit 42 to the AND gate 48, which supplies 16 READOUT pulses to the mileage data register 20. Since the register 20 had been activated by the word output W1, the data stored in register 20 will be outputted in a similar manner as discussed with respect to register 16.

The serial output of the register 20, which corresponds to accumulated mileage stored in the register 20, is supplied to the OR gate 50 and then to the bi-stable 52 for recording onto the tape cassette 6 under the control of the write/step unit 43. The same write/step procedures as discussed with respect to the outputting of the register 16 apply with respect to the register 20. Thus, the data serially outputted from the register 20 is recorded onto the tape cassette 6 during a write period and the tape being stepped in response to each pulse of the STEP output of unit 42. After the READOUT operation of register 20 has terminated, a 2 bit gap is provided between the next data to be recorded thereon, namely, the data from the fuel data register 24.

When the STATUS output changes to a "0" level, the word sequencer and decoder 46 sequences with the next word output W2 providing a "1" level output to the register 24. The AND 40 provides a start signal to the word sequencer and decoder 46, so that a 16 pulse READOUT is supplied to the fuel data register 24. The register 24 thus has the fuel data stored therein outputted in serial form and then applied via the OR gate 50 to the bi-stable 52 and hence to be recorded during the write interval as controlled by the write/step unit 43. The write/step operation is then completed in the same manner as described above with respect to registers 16 and 20.

At the end of the 18 bit period the STATUS output goes to "0" and the word sequencer and decoder 46 sequences so that the next word W3 provides a "1" level to register 32. As previously described, when the STATUS output reverts to the "0" level, a START signal is provided to unit 42 which supplies the "1" level STATUS output and 16 READOUT pulses to read out the data in register 24 in serial manner. The data READOUT of register 24 is applied via the OR gate 50, the bi-stable 52 to be recorded on the tape cassette 6 under the control of the write/step unit 43.

The resetting of the system to terminate the sequencing operation of the word sequence and decoder 46 is accomplished in the following manner. At the beginning of the word W3 when its level changes from a "0" to "1," a mono-stable circuit 56 provides a RESET output pulse in response to the leading edge of the signal W3 to the RESET input of the master flip flop 38. After supplying the RESET pulse, the mono-stable 56 returns to its stable state. In response to the RESET input, the master flip flop 38 changes output states from a "1" to a "0," thereby blocking the AND 40 from supplying any further START pulses to the tape data control unit 42. The RESET output from the mono-stable device 56 is also applied to the RESET inputs of the mileage totalizer 18 and the fuel flow totalizer 22, thereby resetting both totalizers.

The serial reading out of the clock data register 32 continues until the end of the 16 bit READOUT input thereto from the AND gate 48. When the STATUS output reverts to a "0" level, the word sequencer and the decoder 46 sequences so that the "1" output appears at the first output Wo thereof while the other outputs W1, W2 and W3 are at "0.38 Since there is no READOUT output from the AND 48, the input code register 16 will remain in condition to receive input data thereto until the next data entry time is selected as will be the registers 20, 24 and 32.

The system is now RESET to its monitoring and storage mode with mileage and fuel consumption data being sensed, stored and updated in response to distance travelled and fuel consumed. Upon the crossing of the STATE line, the code number "34" would have been inputted into the left two thumbwheels of the manual input device 12 of the driver module 2. This information would be stored in the input code register 16 until the next data entry. The clock 26 would continue to function on a 24-hour basis as previously described. Data is normally only inputted into the system by the depression of the data entry button 14; however, under overflow conditions of either the mileage data register 20, the fuel data register 24 or the clock data register 32, a data entry sequence of operation will follow automatically independent of the depression of the data entry button 14. The most typical manner in which this occurs is at midnight when the clock data register has stored therein the digital word for the hour 24:00. At the occurrence of the next pulse from the time base generator 30, the clock data register 32 overflows and provides an overflow output to an OR gate 58. Thus the OR gate 58 supplies a "1" input to the OR gate 36 which in turn outputs a "1" to SET the master flip flop 38. The output of the flip flop 38 is applied to one input of the AND 40, which has a "1" supplied to the other input thereto due to the inverter 44 connected to the STATUS line normally at a "0" level. In response to the "1" inputs, a START output is provided by the AND 40 which causes the tape and data control 42 to initiate STATUS, GAP and STEP outputs and to start an entire cycle of sequentially reading out the stored data in the registers 16, 20, 24 and 32 in that order as previously described. It should be noted that if the time midnight occurs in the State of Ohio, the digital data corresponding to the Ohio code "34" would be read out and stored in the tape cassette 6. The operation of the system would be otherwise as described with the mileage and fuel flow data appearing in the registers 20 and 24 respectively being read out corresponding to the data appearing therein at the time of midnight.

A similar operation would occur if the mileage data register 20 should overflow, which may have a capacity corresponding to 1,024 miles, with an overflow signal being supplied to the OR gate 58 when this digital number is exceeded. Correspondingly, the fuel data register 24 may have a capacity corresponding to 409.6 gallons of fuel, which when exceeded will supply an overflow signal to the OR gate 58 to institute the data entry of the registers 16, 20, 24 and 32 in that sequence as described above.

If the driver purchases fuel, for example, while in the State of Ohio, the quantity of fuel may be entered by using all three of the thumbwheels on the driver module 2.

For example, if the driver purchases 59.9 gallons of fuel, he would SET the switch 13 on the driver module 2 to "Fuel" and SET the number "59" in the left two thumbwheels and the number "9" in the right thumbwheel of the devices 12.

Switch 13 would activate an additional bit in the input code register 16 by supplying a "1" to the thirteenth bit position of that register while the switch 13 was in a "Fuel" position. This would identify the input data as representing fuel purchased as opposed to State code, for which switch 13 would supply an "0" bit. This identifying bit in the input code register 16 together with the three digit number appearing on the thumbwheels is inputted into the system by depressing the data entry button 14 which instigates the READOUT and sequential recording operation as defined above, with the digital number corresponding to 59.9 being outputted from the input code register 16 and stored on the tape cassette 6. After the depression of the data entry button 14, the driver then returns the State/fuel switch 13 to the "State" position, RESETS the left two thumbwheels to the code number corresponding to the State where the fuel was purchased, for example, "34" for Ohio, and SETS the right thumbwheel to "0."

Upon reaching the next State line, for example, the Ohio/Kentucky line, the driver would depress data entry button 14 causing the State, mileage, fuel and time data to be sequentially read out and recorded. He would then RESET the left two thumbwheels to the code number, for example, "16" for Kentucky. The monitoring and recording operation would continue as described above with data being read out and recorded with the crossing of each State line by the depression of the data entry button 14 by the driver. Also, on the overflow of the clock data register 32, at midnight for each day the data readout and recording operation would be instigated as described above. This would also occur if either the mileage data register 20 or the fuel data register 24 should overflow.

At the end of the trip, this is indicated by the driver entering in the left two thumbwheels of the driver module 2, an end designation number, for example, "53." The driver then depresses the data entry button 14, which causes the readout and record operation to commence with the sequential reading out of the input code register 16 with the digital word for the number 53 being read out and recorded on the tape 6 and thereby designating the end of the trip. The final mileage, fuel consumption and time data would also be recorded corresponding to the end of the trip time at "53."

The tape cassette 6 would then be removed from the digital tape recorder 5. To recover the recorded data, the cassette 6 would be inserted into, for example, a tape cassette reader which would convert the information recorded thereon in serial form into parallel form for inputting into a computer for processing. Manual information would also be supplied to the computer, such as starting odometer reading, the year and the Julian date. The computer would suitably be programmed to accept the data in the sequence as recorded. The printout would take the form of a plurality of columns, designating respectively, e.g., the State and associated code number, distance in miles travelled in that State, the fuel consumption in gallons for that State, fuel purchased in that State and the date/time of crossing into the next State. The States sequentially crossed and the related mileage, fuel consumption, fuel purchased and times would correspondingly be recorded below in the appropriate columns. The total miles travelled on the trip and the total fuel consumed and purchased could also be printed out. Also the average fuel economy could easily be computed with this information. By inputting the Julian date for the beginning date of the trip, the date would be indexed by one day each time that the clock data register 32 provided an overflow pulse to instigate the readout and recording of the then present data as described above. Thus a continuous updating would be provided in response to the time overflow recording provided in the present system. Other forms of processing the recorded data could also be employed as desired by the user; however, it should be observed that by providing a record of State, miles travelled, fuel consumed and purchased in a State this printout could serve as an automatic copy of the trip record as required by various regulatory agencies.

It is, of course, not necessary to limit the monitoring and recording of operational parameters to those described above. By the use of suitable sensing devices, other parameters could easily be monitored, such as, tire pressures, tire, manifold, brake and gearbox temperatures, fluid levels, pressures, etc. Operating parameters thus sensed would be converted into digital pulse form to be applied to totalizers and registers for outputting in the sequential manner as described herein. It is also possible to provide for the manual inputting, via, e.g., thumbwheel or keyed devices, and the sequential recording of reference data if desired, such as, driver and vehicle identification numbers, beginning odometer reading, etc. The monitoring and recording of such parameters in addition to complying with regulatory requirements for trip reports and tax rebates could also greatly aid in ascertaining vehicle defects and to determine replacement and maintenance time periods to minimize greatly on-the-road breakdowns.

I claim:

1. A vehicle mounted system for monitoring and storing values of parameters associated with operation of the vehicle comprising sensor means connected to the vehicle for sensing values of operational parameters of the vehicle, pulse producing means connected to the sensor means for producing pulses representative of the values of operational parameters of the vehicle in response to the sensor means, counter means connected to the pulse producing means for receiving and accumulating pulses from the pulse producing means and providing parallel signals representative of the accumulated pulses, temporary storage register means connected to the counter means for receiving and storing the signals from the counter means and including paralled to series converter means for converting the stored signals from paralled to series signals, sequencer and decoder means connected to the temporary storage register means for reading out the stored series signals in a predetermined sequence upon initiation, input code register means connected to the sequencer and decoder means for receiving and storing parallel signals and including parallel to series converter means for converting the stored parallel signals to a series signals and driver module input means connected to the input code register means for producing parallel signals, the driver module input means comprising a first manually settable counter means for producing parallel signals representative of states and a second manually settable counter means for producing parallel signals representative of amounts of fuel received, data entry means connected to the driver module input means and connected to the sequencer and decoder means for selectively initiating operation of the sequencer and decoder means, and permanent storage means connected to the temporary storage register means for receiving the signals read out from the temporary storage register means, said sequencer and decoder means reading out the stored series signals from the input code register to the permanent storage means, and permanent storage control means connected to the temporary storage register means and to the sequencer and decoder means and to the permanent storage means for starting the sequencer and decoder means and permanent storage means for reading out series signals from the temporary storage register means to the permanent storage means, in response to an overflow of the signals stored in the temporary storage register means.

2. The system of claim 1 wherein:

said pulse means further includes, clock means connected to the temporary storage means for continuously providing data in digital form to the temporary storage means, the data corresponding to a reference parameter indicative of the time.

3. The system of claim 1 wherein:

said sensor means comprises distance sensing means connected to the vehicle for sensing mileage travelled by the vehicle from a data entry point to a reference point.

4. The system of claim 1 wherein:

said sensor means comprises fuel sensing means connected to the vehicle for sensing fuel consumed by the vehicle from a reference point to a data entry point.

5. The system of claim 1 wherein: said permanent storage means includes, a storing medium removably connected to the temporary storage means for receiving and storing said data and adaptable to provide the data to a playback means connected to the storage medium when removed to convert the data into printed form.

6. The vehicle mounted system of claim 1 wherein the sensor means comprises fuel flow sensor means connected to the vehicle for sensing fuel consumption by the vehicle and wherein the counter means comprises fuel flow totalizer means connected to the pulse producing means for counting the pulses received from the pulse producing means and providing signals representative of the fuel consumed by the vehicle and wherein the register means comprises temporary fuel data register means connected to the fuel flow totalizer means for receiving and storing the signals from the fuel flow totalizer means.

7. The vehicle mounted system of claim 1 further comprising an oscillator, a time base generator connected to the oscillator for providing parallel signals representative of time in response to the oscillator, a temporary storage clock data register connected to the time base generator and connected to the sequencer and decoder means for temporary storage of signals from the time base generator; the temporary storage clock data register including parallel to series converter means for converting the temporary stored parallel signals to series signals and for transferring the series signals to the permanent storage means as controlled by the sequencer and decoder.

8. The vehicle mounted system of claim 1 wherein the permanent storage means comprises recording tape, recording tape control means connected to the data entry means for sequentially recording the signals read out to the permanent storage means in response to the data entry means and wherein the sequencer and decoder means is connected to the tape control means for reading out the signals from the temporary storage register means and input code register means to the permanent storage means in a sequence coordinated with the recording sequence.

* * * * *

UNITED STATES PATENT AND TRADEMARK OFFICE

CERTIFICATE OF CORRECTION

PATENT NO. : 4,067,061

DATED : January 3, 1978

INVENTOR(S) : John Emil Juhasz

It is certified that error appears in the above-identified patent and that said Letters Patent are hereby corrected as shown below:

Column 2, Line 38, After "the" first occurrence, delete 'feul' and insert --fuel--.

Column 6, Line 18, After "at" delete '0.38' and insert --0.--.

Signed and Sealed this

*Twenty-second* Day of *August 1978*

[SEAL]

*Attest:*

RUTH C. MASON
*Attesting Officer*

DONALD W. BANNER
*Commissioner of Patents and Trademarks*